(12) United States Patent
Chien et al.

(10) Patent No.: US 8,773,372 B2
(45) Date of Patent: Jul. 8, 2014

(54) OPTICAL PLATE STRUCTURE FOR A TOUCH PANEL, AND TOUCH DISPLAY PANEL AND TOUCH LIQUID CRYSTAL DISPLAY PANEL INCLUDING THE SAME

(75) Inventors: Chih-Wei Chien, Hsin-Chu (TW); Shau-Yu Tsai, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 856 days.

(21) Appl. No.: 12/948,744

(22) Filed: Nov. 17, 2010

(65) Prior Publication Data
US 2012/0032920 A1 Feb. 9, 2012

(30) Foreign Application Priority Data
Aug. 5, 2010 (TW) .............................. 99126076 A

(51) Int. Cl.
*G06F 3/042* (2006.01)
(52) U.S. Cl.
CPC ............ *G06F 3/0428* (2013.01); *G06F 3/0421* (2013.01)
USPC ........................................................ 345/173
(58) Field of Classification Search
CPC .............................. G09F 3/0428; G09F 3/0421
USPC ............................................................. 345/173
See application file for complete search history.

(56) References Cited

U.S. PATENT DOCUMENTS

| 5,598,280 | A | 1/1997 | Nishio |
| 7,232,986 | B2 | 6/2007 | Worthington |
| 2008/0143682 | A1* | 6/2008 | Shim et al. ................... 345/173 |
| 2009/0219261 | A1 | 9/2009 | Jacobson |
| 2009/0295744 | A1 | 12/2009 | Onishi |
| 2009/0295755 | A1* | 12/2009 | Chapman et al. ............. 345/175 |
| 2010/0134431 | A1* | 6/2010 | Tsai et al. ..................... 345/173 |
| 2011/0037730 | A1 | 2/2011 | Wang et al. |

FOREIGN PATENT DOCUMENTS

| CN | 101666932 A | 3/2010 |
| CN | 101667084 A | 3/2010 |
| CN | 201465072 U | 5/2010 |
| TW | I223107 | 11/2004 |
| TW | M359718 | 6/2009 |

* cited by examiner

*Primary Examiner* — Viet Pham
(74) *Attorney, Agent, or Firm* — Winston Hsu; Scott Margo

(57) ABSTRACT

An optical plate structure for a touch panel includes an optical plate, at least a light source, and at least an optical camera. A light-emitting surface of the optical plate includes a plurality of micro-structure. The light source is disposed beside a vertical side of the optical plate and emits a first light entering the optical plate. The optical plate guides the first light and emits a second light from the light-emitting surface. The optical camera is disposed beside the optical plate or in a corner of the optical plate and above the light-emitting surface, for detecting a third light incident on the light camera. The second light is reflected by an object touching the optical plate to become the third light. The optical plate structure for a touch panel may be utilized in a touch display panel or a touch liquid crystal display panel.

12 Claims, 3 Drawing Sheets

OPTICAL PLATE STRUCTURE FOR A TOUCH PANEL, AND TOUCH DISPLAY PANEL AND TOUCH LIQUID CRYSTAL DISPLAY PANEL INCLUDING THE SAME

BACKGROUND OF THE INVENTION

1. Field of the Invention

The present invention relates to an optical plate structure, and particularly to an optical plate structure for a touch panel and a touch display panel and a touch liquid crystal display device containing the same.

2. Description of the Prior Art

Touch panels have been widely used as an interface for data input in electronic products, such as personal digit assistant (PDA), mobile phone, notebook and tablet PC. The touch panel also can have all the functions of keyboard, mouse, and the like and be for handwriting input. Particularly, the functions of input and output can be integrated into a same interface (i.e. display panel, also referred to as screen) to form a touch display panel.

FIG. 1 is a schematic cross-sectional view illustrating a conventional touch liquid crystal display device. As shown in FIG. 1, a backlight unit is disposed under a liquid crystal display panel 10. The backlight unit includes a light guide plate 12 and a white LED light source 14 disposed beside the light guide plate 12. The touch mechanism is an optical touch mechanism, that is, an infrared light LED light source 16 is disposed at another side (usually a side opposite to the white light LED light source 14) of the light guide plate 12. The emitted infrared light also passes through the light guide plate 12 and reaches the display side 18 of the liquid crystal panel 10 directly or through reflection. When a user's finger 20 approaches or touches the display side 18, the infrared light is reflected to reach a complementary metal oxide semiconductor (CMOS) image sensor 22 disposed on a side of the liquid crystal display panel 10 for light detection and electric signal conversion to carry out a touch mechanism. However, since the infrared light requires passing through the liquid crystal display panel 10, the light intensity disadvantageously massively decreases. Accordingly, it is required for the infrared light LED to provide a relatively high light intensity. As a result, the system efficiency is relatively low, and the brightness of the white light will be diminished or an infrared light LED with a more brightness should be employed.

Therefore, there is still a need for a novel optical plate structure for a touch panel to improve system efficiency.

SUMMARY OF THE INVENTION

An object of the present invention is to provide an optical plate structure for a touch panel, in which the required intensity of the light emitted from the light source in the touch mechanism is relatively low and accordingly the system efficiency is relatively high. When the optical plate structure is applied in a touch display device, the white light serving as a backlight of the display panel will not be affected.

Another object of the present invention is to provide a touch display panel or a touch liquid crystal display device containing the aforesaid optical plate structure. They will also have the advantages as described above.

The optical plate structure for a touch panel according to the present invention includes an optical plate, at least alight source, and at least an optical camera. A light-emitting surface of the optical plate includes a plurality of micro-structures. The light source is disposed beside a vertical side of the optical plate. The light source emits a first light to enter the optical plate. The first light is guided by the optical plate and emitted from the light-emitting surface of the optical plate to become a second light. The optical camera is disposed beside or in a corner of the optical plate and above the light-emitting surface to detect a third light incident on the light camera. The third light is the light obtained from reflection of the second light by an object touching the optical plate.

In another aspect of the present invention, the touch display panel according to the present invention includes an optical plate structure for a touch panel as described above or a modification thereof, and a display panel disposed under the optical plate structure for a touch panel.

In further another aspect of the present invention, the touch display panel according to the present invention includes an optical plate structure for a touch panel as described above or a modification thereof, a liquid crystal display panel disposed under the optical plate structure for a touch panel and a backlight module disposed under the liquid crystal display panel.

In the optical plate structure for a touch panel of the present invention, a light-emitting surface of the optical plate includes micro-structures, such that, the touch can be relatively smooth without great damage to the total reflection, and contamination due to fingerprint can be reduced. Furthermore, after the light is coupled and enters the optical plate, the light will be emitted from the optical plate at a large angle. This light emitted at the large angle is reflected by the object touching the optical plate and enters the optical camera located at a place higher than the light-emitting surface, to accomplish the touch mechanism.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
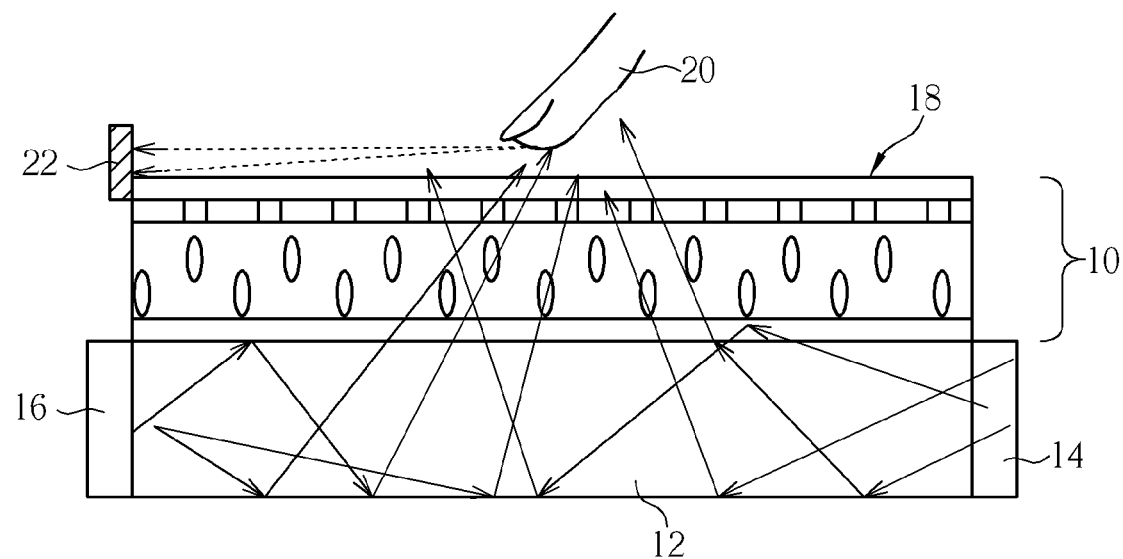
FIG. 1 is a schematic cross-sectional view illustrating a conventional touch liquid crystal display device.
Figure 2:
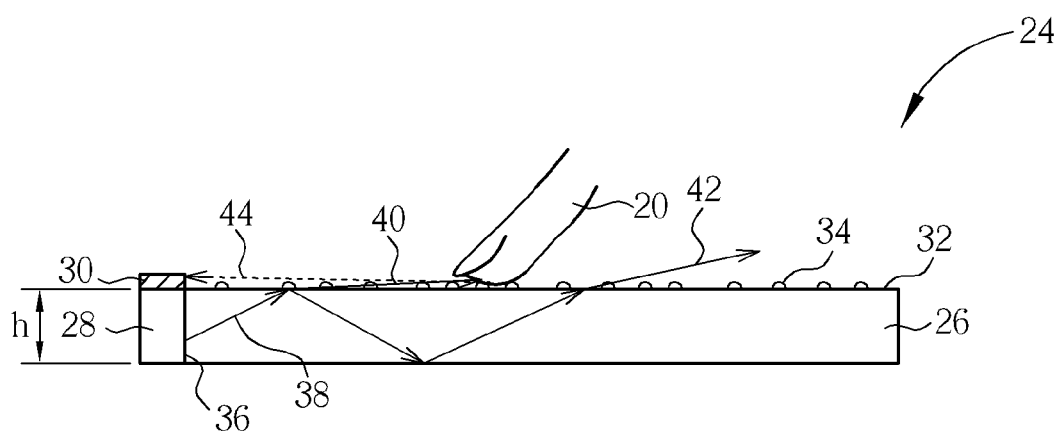
FIG. 2 is a schematic cross-sectional view illustrating an optical plate structure for a touch panel according to an embodiment of the present invention.

FIG. 2 illustrates an optical plate structure for a touch panel according to an embodiment of the present invention. An optical plate structure for a touch panel 24 includes an optical plate 26, at least a light source 28, and at least an optical camera 30. A light-emitting surface 32 of the optical plate 26 includes a plurality of micro-structures 34. The "light-emitting surface 32" is that surface which is seen by users when the users operate the optical plate structure for a touch panel. The light from the light source 28 will eventually be emitted from this surface including the micro-structures 34 thereon. The micro-structures 34 can improve luminous intensity, as well as to render the light-emitting surface of the optical plate a touch feeling and an anti-smudge effect. There may be one light source 28 or more disposed beside a vertical side "h" of the optical plate 26. The term "a vertical side" means the side that lies substantially along the vertical direction when the optical plate is put in a way that the light-emitting surface lies long the horizontal direction. The light source 28 emits a light 38. The light 38 is incident on the side surface 36 to enter the optical plate 26, guided to pass through the inner of the optical plate 26, and emitted from the light-emitting surface 32 to become the light 40 and the light 42. The light source 28 may be for example an ultra-violet light source, a visible light source or an infrared light source. In consideration of human health and visual taste, an infrared light source is preferred. A near-infrared light source is more preferred for accommodation to the acceptable wavelength range of the light camera. With respect to an infrared light, the wavelength of a near-infrared light is within a range from 0.75 µm to 1.5 µm; the wavelength of a mid-infrared light is within a range from 1.5 µm to 5.6 µm; and the wavelength of a far-infrared light is within a range from 5.6 µm to 1000 µm. The light source may be for example an LED. The optical camera 30 is disposed beside or in a corner of the optical plate 26 and at a position higher than the light-emitting surface 32, for detecting a light 44 incident on the light camera 30. The light 40 is reflected by an object (such as the user's finger 20) which touches the optical plate 26 to become the light 44. The optical camera 30 is a device for detection of light and may be for example a digital optical camera including a charge-coupled device (CCD) image sensor or a CMOS image sensor. The optical camera 30 is higher than the light-emitting surface 32, and accordingly the light reflected by the object can be well detected. The optical camera 30 may be electrically connected to a printed circuit board for determination of the touched position of the optical plate.

The material of the optical plate may be a light transmittable material, for example, polymethylmethacrylate (PMMA), polyethylene terephthalate (PET), polycarbonate (PC), MS (a blend of PMMA and PC), glass, and the like. The thin plate may have a substantially even thickness or be in a wedge shape. The size of the micro-structure is preferably not to affect the visual taste. It may advantageously depend on the roughness desired for the light-emitting surface. The micro-structure may be formed through for example a process of sand blasting, screen printing, laser engraving, transfer printing or etching. The process of sand blasting includes forming particles on the light-emitting surface to serve as the micro-structures using the conventional method. The process of screen printing includes printing a material having a different refractive index on the light-emitting surface to form the micro-structures. The process of laser engraving includes using a laser beam to directly engrave micro-structures on the light-emitting surface. The process of transfer printing includes transfer-printing micro-structures on the light-emitting surface through utilizing a die having the shape of the micro-structure. The process of etching includes partly etches the light-emitting surface not covered by a patterned mask to form micro-structures.

Figure 3:
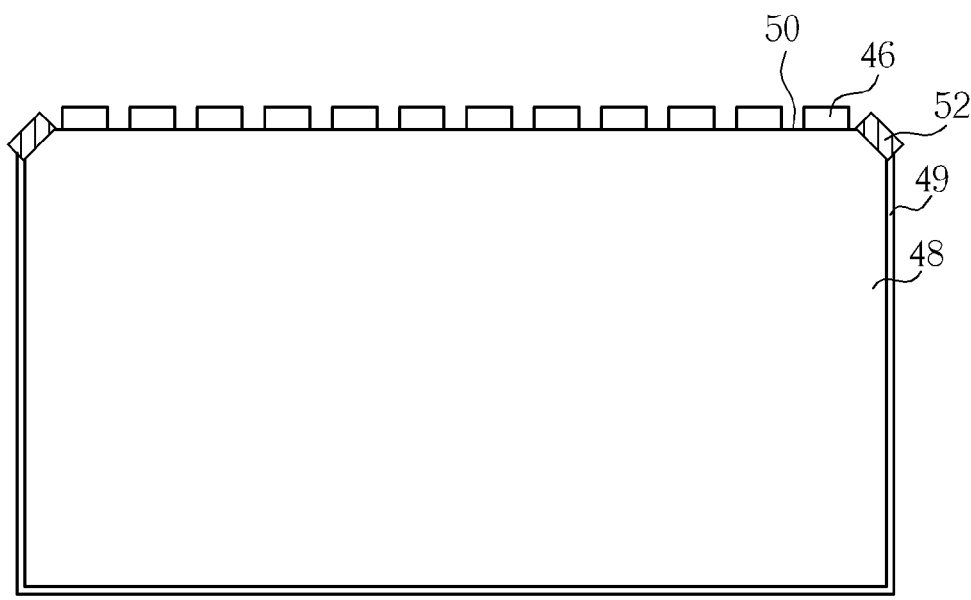
FIG. 3 is a schematic plan view illustrating an optical plate structure for a touch panel according to another embodiment of the present invention.

FIG. 3 is a schematic plan view illustrating an optical plate structure for a touch panel according to another embodiment of the present invention. A plurality of near-infrared light sources 46 are disposed beside a vertical side 50 of an optical plate 48. The near-infrared light sources 46 may be alternatively arranged to become a bar-shaped light source. Two optical cameras 52 may be disposed on two corners of the optical plate 48 respectively and higher than the light-emitting surface. The three sides of the optical plate 48 may be covered with a white sheet or silver sheet 49 to reflect the light from the near-infrared light source 46 for recovery and sufficient use.

Figure 4:
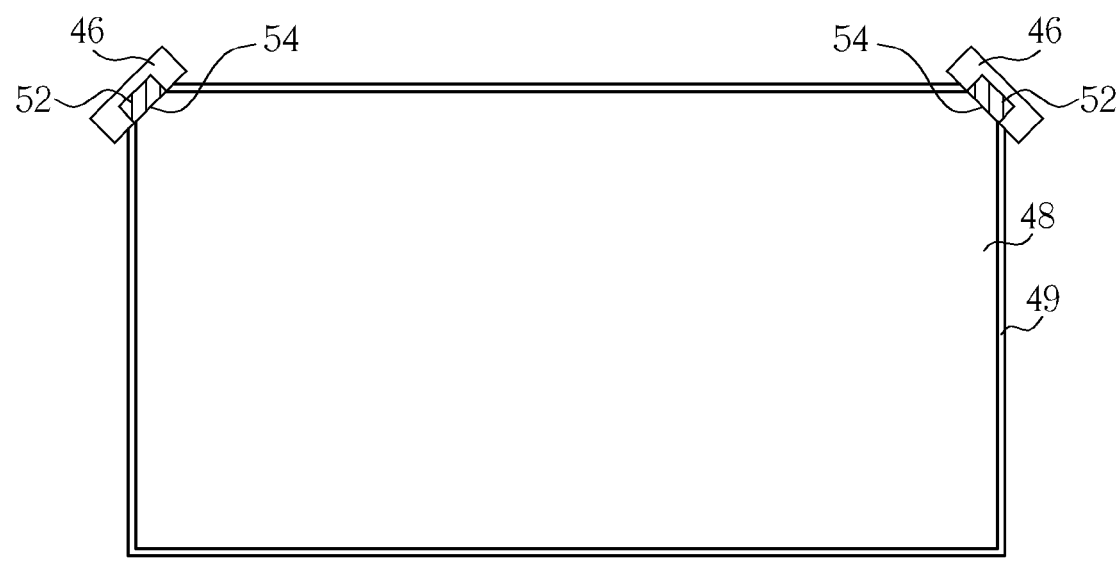
FIG. 4 is a schematic plan view illustrating an optical plate structure for a touch panel according to further another embodiment of the present invention.

FIG. 4 is a schematic plan view illustrating an optical plate structure for a touch panel according to further another embodiment of the present invention. The optical plate 48 may have two cut out corners. Two near-infrared light sources 46 are disposed beside two vertical sides 54 of the optical plate 48, respectively. The sides other than the sides 54 may be covered with a white sheet or silver sheet 49. Two optical cameras 52 may be disposed on two near-infrared light sources 46 respectively and higher than the light-emitting surface.

The optical plate structure for a touch panel according to the present invention can be well combined with an electronic product to serve as a touch input device. For example, it in itself may be formed as a touch panel or it may be integrated with a display panel together to form a touch display panel. Particularly with respect to a touch display panel, it is important for the aesthetic and the taste of a light-emitting surface of the optical plate. For example, as serving in a touch liquid crystal display device, the optical plate has a light-emitting surface with micro-structures distributed thereon, such that the light-emitting surface is allowed to have a roughness represented by an Ra value of preferably 0 to 0.25 µm, and more preferably about 0.16 µm, for preventing the visual taste from being affected. Furthermore, with respect to the distribution of the micro-structures, it is preferred that the Ra value of the light-emitting surface at a place relatively far to the light source is greater than the Ra value of the light-emitting surface at a place relatively near to the light source. It is because the reflected light is intensive when the roughness is great and the reflected light is weak when the distance from the light source is far. In short, the luminous intensity of the entire light-emitting surface can be more uniform when the Ra value at a place relatively far to the light source is allowed to be relatively great. Alternatively, with respect to the distribution of the micro-structures, the Ra value of the light-emitting surface at a place relatively far to the light camera is greater than the Ra value of the light-emitting surface at a place relatively near to the light camera. In short, the luminous intensity of the entire light-emitting surface can be detected as more uniform when the Ra value at a place relatively far to the light camera is allowed to be relatively great.

If the optical plate structure for a touch panel is utilized per se to serve as a touch panel, there is no visual taste issue for a display panel, and accordingly it is not necessary to particularly further define the roughness. In consideration of improvement of the luminous intensity, it is preferred that the distribution of the micro-structures is dense. In the situation that the optical plate structure for a touch panel is utilized to serve as a touch panel, a visible light may be selected as the light source to avoid the issue of interference with the backlight.

Figure 5:
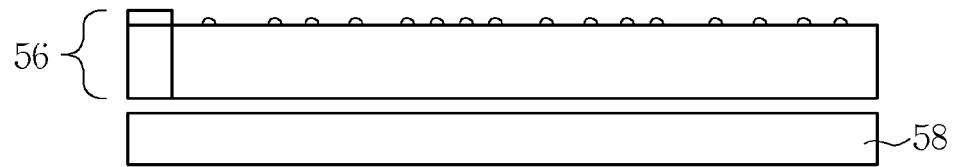
FIG. 5 is a schematic cross-sectional view illustrating a touch display panel according to an embodiment of the present invention.

FIG. 5 indicates an embodiment of the present invention to combine the optical plate structure for a touch panel with a display channel to form a touch display panel. An optical plate structure 56 for a touch panel and a display panel 58 are combined with each other and stacked up and down. The combination may be carried out through for example surface mounting or insertion.

Figure 6:
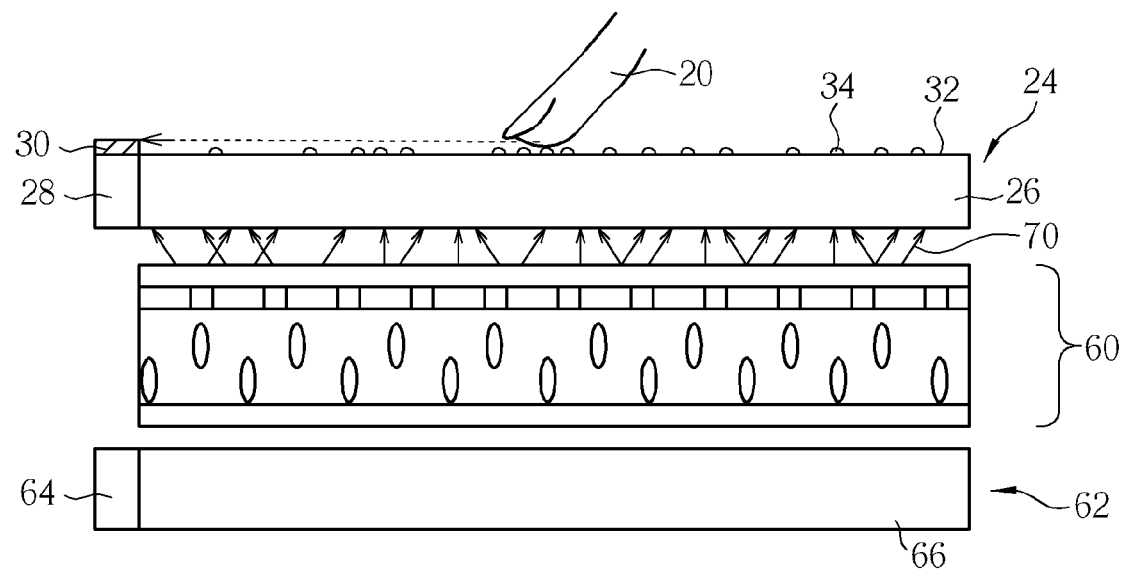
FIG. 6 is a schematic cross-sectional view illustrating a touch liquid crystal display device according to an embodiment of the present invention.

FIG. 6 illustrates an embodiment of a touch liquid crystal display device including the optical plate structure for a touch panel according to the present invention. A liquid crystal display panel 60 is disposed under the optical plate structure 24 for a touch panel. A backlight module 62 is disposed under the liquid crystal display panel 60. Specifically, the backlight module 62 may include for example a backlight source 64 and a light guide plate 66. In this embodiment, the backlight source 64 is disposed at a side of the light guide plate 66. The backlight is incident upon a lower surface of the liquid crystal display panel 60 and emitted from an upper surface. The emitted light may be illustrated by for example the light 70. Thereafter, the light 70 is incident onto a lower surface of the optical plate structure 24 for a touch panel and then emitted from a light-emitting surface 32. Generally, the backlight source 64 is a white light source, such as a white light LED. The light source 28 utilized in the optical plate structure 24 for a touch panel is preferably an invisible light and disposed beside the optical plate 26. Due to such front optical plate-like structure, the light emitted from the light source 28 does not require passing through the liquid crystal display panel 60 to suffer attenuation, and accordingly the touch module system efficiency can be improved and the white backlight for display is not affected. Furthermore, if a certain visual taste is demanded, the micro-structures of the light-emitting surface of the optical plate may be designed to allow the light-emitting surface to have a certain roughness, as described above. Accordingly, the touch liquid crystal display device according to the present invention may be referred to as including a direct type optical touch panel, in which the invisible light source may also contribute to the backlight, and accordingly the display panel system has relatively high efficiency. Furthermore, the light-emitting surface of the optical plate may have a certain roughness, such that it has properties of anti-smudge and good touch feeling upon operation.

Those skilled in the art will readily observe that numerous modifications and alterations of the device and method may be made while retaining the teachings of the invention.

What is claimed is:

1. An optical plate structure for a touch panel, comprising:
   an optical plate having a light-emitting surface and a side surface, wherein the light-emitting surface and the side surface are connected to each other, and the light-emitting surface comprises a plurality of micro-structures;
   at least a light source, disposed beside the side surface of the optical plate, and emitting a first light to be incident on the side surface to enter the optical plate, wherein the first light is guided by the optical plate and emitted out of the optical plate from the light-emitting surface of the optical plate to become a second light, wherein the micro-structures allow the light-emitting surface to have a first Ra value at a place relatively far to the light source and a second Ra value at a place relatively near to the light source, and the first Ra value is greater than the second Ra value; and
   at least an optical camera disposed beside or in a corner of the optical plate and above the light-emitting surface, for detecting a third light incident on the light camera, wherein the second light is reflected by an object touching the optical plate to become the third light.

2. The optical plate structure for a touch panel according to claim 1, further comprising a printed circuit board electrically connected to the optical camera for determining the position of the optical plate being touched.

3. The optical plate structure for a touch panel according to claim 1, wherein the light source comprises an ultra-violet light, a visible light or an infrared light.

4. The optical plate structure for a touch panel according to claim 1, wherein the optical camera comprises a charge-coupled device image sensor or a complementary metal oxide semiconductor image sensor.

5. The optical plate structure for a touch panel according to claim 1, wherein the micro-structures comprise a plurality of structures formed through a process of sand blasting, screen printing, laser engraving, transfer printing or etching.

6. The optical plate structure for a touch panel according to claim 1, wherein the micro-structures allow the light-emitting surface to have a roughness as an Ra value of 0 to 0.25 µm.

7. The optical plate structure for a touch panel according to claim 1, wherein the micro-structures allow the light-emitting surface to have a first Ra value at a place relatively far to the optical camera and a second Ra value at a place relatively near to the optical camera, and the first Ra value is greater than the second Ra value.

8. The optical plate structure for a touch panel according to claim 1, wherein the optical plate structure for a touch panel comprises two optical cameras each disposed on each of two corners of the optical plate and higher than the light-emitting surface.

9. The optical plate structure for a touch panel according to claim 1, wherein the optical plate structure for a touch panel comprises:
   two light sources each disposed beside a vertical side of each of two cut out corners of the optical plate, and
   two optical cameras each disposed above each of the two light sources and higher than the light-emitting surface.

10. The optical plate structure for a touch panel according to claim 1, wherein the at least a light source comprises a bar-shaped infrared light source or a visible light source disposed beside the optical plate.

11. A touch display panel, comprising:
   an optical plate structure for a touch panel according to claim 1; and
   a display panel disposed under the optical plate structure for a touch panel.

12. A touch liquid crystal display device, comprising:
   an optical plate structure for a touch panel according to claim 1;
   a liquid crystal display panel disposed under the optical plate structure for a touch panel; and
   a backlight module disposed under the liquid crystal display panel.

* * * * *